US009578515B2

(12) United States Patent
Gaal et al.

(10) Patent No.: US 9,578,515 B2
(45) Date of Patent: Feb. 21, 2017

(54) METHODS AND APPARATUSES FOR FREQUENCY SPECTRUM SHARING

(75) Inventors: Peter Gaal, San Diego, CA (US); Alan Barbieri, San Diego, CA (US); Rajat Prakash, La Jolla, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 13/469,064

(22) Filed: May 10, 2012

(65) Prior Publication Data

US 2013/0039171 A1 Feb. 14, 2013

Related U.S. Application Data

(60) Provisional application No. 61/486,200, filed on May 13, 2011.

(51) Int. Cl.
*H04W 4/00* (2009.01)
*H04W 16/14* (2009.01)
*H04W 16/06* (2009.01)
*H04W 36/22* (2009.01)

(52) U.S. Cl.
CPC ........... *H04W 16/14* (2013.01); *H04W 16/06* (2013.01); *H04W 36/22* (2013.01)

(58) Field of Classification Search
USPC ..... 370/216, 217, 225, 241.1, 242, 328, 329
See application file for complete search history.

(56) References Cited

U.S. PATENT DOCUMENTS

| 5,034,993 | A | 7/1991 | Sasuta et al. |
| 6,826,160 | B1 * | 11/2004 | Wang et al. ............. 370/329 |
| 8,116,780 | B2 | 2/2012 | Lee et al. |
| 2006/0039309 | A1 | 2/2006 | Lee et al. |

(Continued)

FOREIGN PATENT DOCUMENTS

| CN | 101573894 A | 11/2009 |
| CN | 101801000 A | 8/2010 |

(Continued)

OTHER PUBLICATIONS

Kang et al., On Outage Capacity of Secondary Users in Fading Cognitive Radio Networks with Primary User's Outage Constraint, IEEE Global Telecommunications Conference, [Online] 2009, pp. 1-5. See pp. 1-3 and 5.

(Continued)

*Primary Examiner* — Kwang B Yao
*Assistant Examiner* — Nguyen Ngo
(74) *Attorney, Agent, or Firm* — Harrity & Harrity, LLP

(57) ABSTRACT

Techniques are provided for frequency spectrum sharing that allows secondary operators to access a frequency band of a primary operator without interfering with the primary operator's use of the band, while ensuring service continuity for devices of the secondary operators. For example, there is provided a method that may involve identifying an outage on a first channel of a plurality of channels of a spectrum, wherein each of the plurality of channels is allocated to one of a plurality of operators. The method may involve migrating all mobile stations in communication over the first channel of the plurality of channels to at least one other channel of the plurality of channels during the outage.

21 Claims, 11 Drawing Sheets

(56) References Cited

U.S. PATENT DOCUMENTS

| | | |
|---|---|---|
| 2006/0094434 A1 | 5/2006 | Peltola et al. |
| 2006/0171305 A1* | 8/2006 | Stefani et al. ............... 370/228 |
| 2007/0281711 A1* | 12/2007 | Matta .................. H04L 47/10 455/453 |
| 2008/0219213 A1 | 9/2008 | Natarajan et al. |
| 2009/0081946 A1* | 3/2009 | Dankberg et al. .......... 455/3.02 |
| 2009/0215451 A1 | 8/2009 | Lim et al. |
| 2010/0056167 A1 | 3/2010 | Guvenc |
| 2010/0127676 A1 | 5/2010 | Yamazaki et al. |
| 2010/0309806 A1 | 12/2010 | Wu et al. |
| 2011/0069638 A1 | 3/2011 | Ishizu et al. |
| 2011/0149750 A1* | 6/2011 | Sharma ............... H04W 36/14 370/252 |
| 2011/0228666 A1 | 9/2011 | Barbieri et al. |
| 2011/0255481 A1* | 10/2011 | Sumcad ............. H04W 76/028 370/329 |
| 2012/0063383 A1 | 3/2012 | Barbieri et al. |
| 2012/0120887 A1* | 5/2012 | Deaton et al. ............... 370/329 |
| 2012/0135675 A1* | 5/2012 | Kim et al. ....................... 455/1 |
| 2012/0244901 A1* | 9/2012 | Sachs et al. ................ 455/509 |
| 2013/0021918 A1* | 1/2013 | Fiorone et al. ............. 370/242 |
| 2014/0029434 A1* | 1/2014 | Wang et al. ................ 370/236 |

FOREIGN PATENT DOCUMENTS

| | | |
|---|---|---|
| CN | 101860937 A | 10/2010 |
| EP | 1220557 A1 | 7/2002 |
| JP | 10023502 | 1/1998 |
| JP | 2009049904 A | 3/2009 |
| JP | 2009118320 A | 5/2009 |
| JP | 2011071625 A | 4/2011 |
| JP | 2012529780 A | 11/2012 |
| WO | 2008129660 A1 | 10/2008 |
| WO | 2009050212 A1 | 4/2009 |
| WO | 2010142021 A1 | 12/2010 |

OTHER PUBLICATIONS

3GPP2 C.S0005-A: "Upper Layer (Layer 3) Signaling Standard for cdma2000 Spread Spectrum Systems", Release: A, Version date: Jun. 9, 1999, pp. 7, Section 3.7.2.3.2.18.

International Search Report and Written Opinion—PCT/US2012/037604—ISA/EPO—Jul. 27, 2012.

* cited by examiner

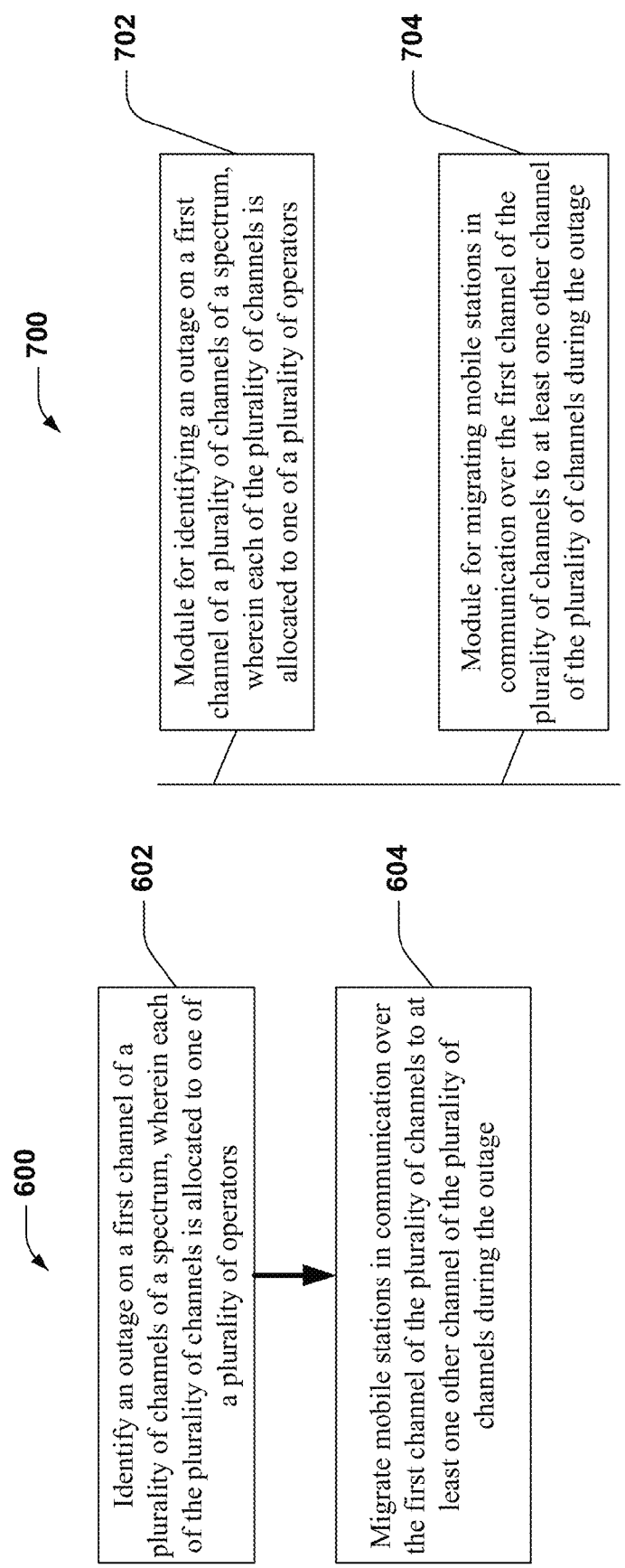

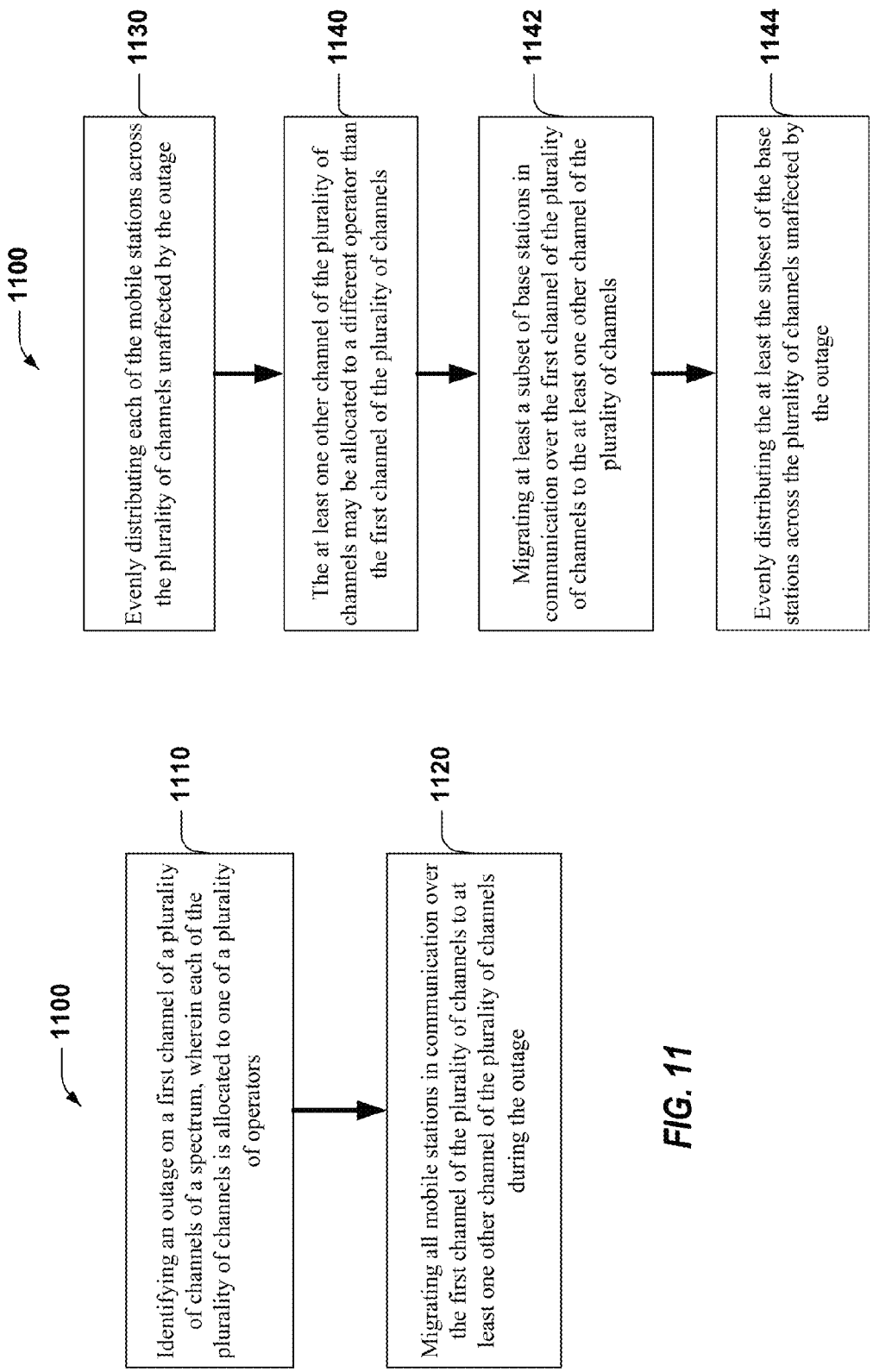

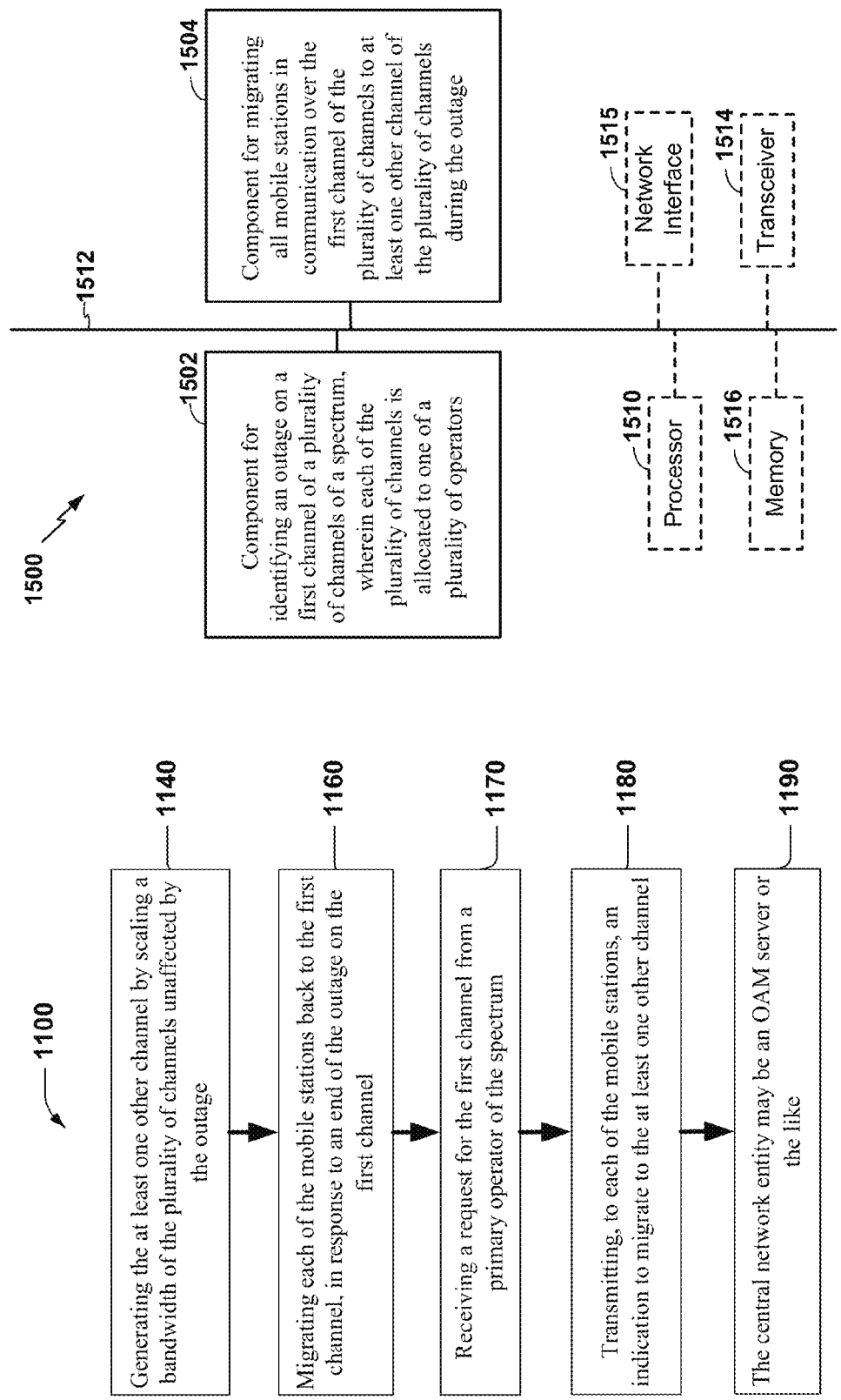

METHODS AND APPARATUSES FOR FREQUENCY SPECTRUM SHARING

CROSS-REFERENCE TO RELATED APPLICATION

The present Application for Patent claims priority to Provisional Application No. 61/486,200, filed May 13, 2011, entitled "METHODS AND APPARATUSES FOR FREQUENCY SPECTRUM SHARING", and is assigned to the assignee hereof, and is hereby expressly incorporated in its entirety by reference herein.

BACKGROUND

Field

Aspects of the present disclosure relate generally to wireless communication systems, and more particularly, to enhancements for frequency spectrum sharing.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of network entities, such as base stations, that can support communication for a number of mobile stations, entities, or devices, such as, for example, user equipments (UEs) or access terminals (ATs). A mobile station may communicate with a base station via a downlink and uplink. The downlink (or forward link) refers to the communication link from the base station to the UE, and the uplink (or reverse link) refers to the communication link from the UE to the base station. The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as evolved Node Bs (eNBs), and mobile entities, such as UEs.

The wireless communication networks may communicate over licensed frequency bands of a radio frequency spectrum. However, some of the frequency bands may be underutilized by the incumbent primary licensee, primary user or primary operator. Thus, these underutilized bands may be made available to secondary operators, e.g., cellular operators, so long as the there is no harmful interference with the use of the bands by the primary operators. In this context, there is a need for enhancements to spectrum sharing that allow the secondary operators to access a frequency band of a primary operator without interfering with the primary operator's use of the band, while ensuring service continuity for devices of the secondary operators.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Described herein are techniques for spectrum sharing that allow secondary operators to access a frequency band of a primary operator without interfering with the primary operator's use of the band, while ensuring service continuity for devices of the secondary operators.

In an aspect, a method for wireless communication is disclosed. An outage on a first channel of a plurality of channels of a spectrum is identified, wherein each of the plurality of channels is allocated to one of a plurality of operators. Mobile stations in communication over the first channel of the plurality of channels are migrated to at least one other channel of the plurality of channels during the outage.

In another aspect, an apparatus for wireless communication is disclosed. The apparatus includes means for identifying an outage on a first channel of a plurality of channels of a spectrum, wherein each of the plurality of channels is allocated to one of a plurality of operators, and means for migrating mobile stations in communication over the first channel of the plurality of channels to at least one other channel of the plurality of channels during the outage.

In yet another aspect, an apparatus for wireless communication is disclosed. The apparatus includes at least one processor configured to identify an outage on a first channel of a plurality of channels of a spectrum, wherein each of the plurality of channels is allocated to one of a plurality of operators, and migrate mobile stations in communication over the first channel of the plurality of channels to at least one other channel of the plurality of channels during the outage.

In yet another aspect, a computer program product includes a non-volatile computer-readable medium. The non-volatile computer-readable medium includes code for causing at least one computer to identify an outage on a first channel of a plurality of channels of a spectrum, wherein each of the plurality of channels is allocated to one of a plurality of operators, and code for causing the at least one processor to migrate mobile stations in communication over the first channel of the plurality of channels to at least one other channel of the plurality of channels during the outage.

In yet another aspect, a method for wireless communication is disclosed. An indication to migrate to a second channel of a spectrum is received, while communicating over a first channel of the spectrum, due to an outage on the first channel, and migration from the first channel to the second channel occurs.

In yet another aspect, an apparatus for wireless communication is disclosed. The apparatus includes means for receiving an indication to migrate to a second channel of a spectrum, while communicating over a first channel of the spectrum, due to an outage on the first channel, and means for migrating from the first channel to the second channel.

In yet another aspect, an apparatus for wireless communication includes at least one processor configured to receive an indication to migrate to a second channel of a spectrum, while communicating over a first channel of the spectrum, due to an outage on the first channel, and to migrate from the first channel to the second channel.

In yet another aspect a computer program product includes a non-volatile computer-readable medium. The non-volatile computer-readable medium includes code for causing at least one computer to receive an indication to migrate to a second channel of a spectrum, while communicating over a first channel of the spectrum, due to an outage on the first channel, and code for causing the at least one processor to migrate from the first channel to the second channel.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 6 is a flow chart representation of a process for wireless communication.

FIG. 7 is a block diagram representation of a portion of a wireless communication apparatus.

FIG. 11 illustrates an embodiment of a methodology for frequency spectrum sharing, performed at a central network entity or the like.

FIGS. 12-13 show further aspects of the methodology of FIG. 11.

FIG. 15 illustrates an embodiment of an apparatus for frequency spectrum sharing that may be configured as a central network entity (e.g., an OAM server or the like) in a wireless network, or as a processor or similar device for use within the central network entity.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. The word "exemplary" is used herein to mean serving as an example, instance, or illustration. Any aspect or design described herein as "exemplary" is not necessarily to be construed as preferred or advantageous over other aspects or designs.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
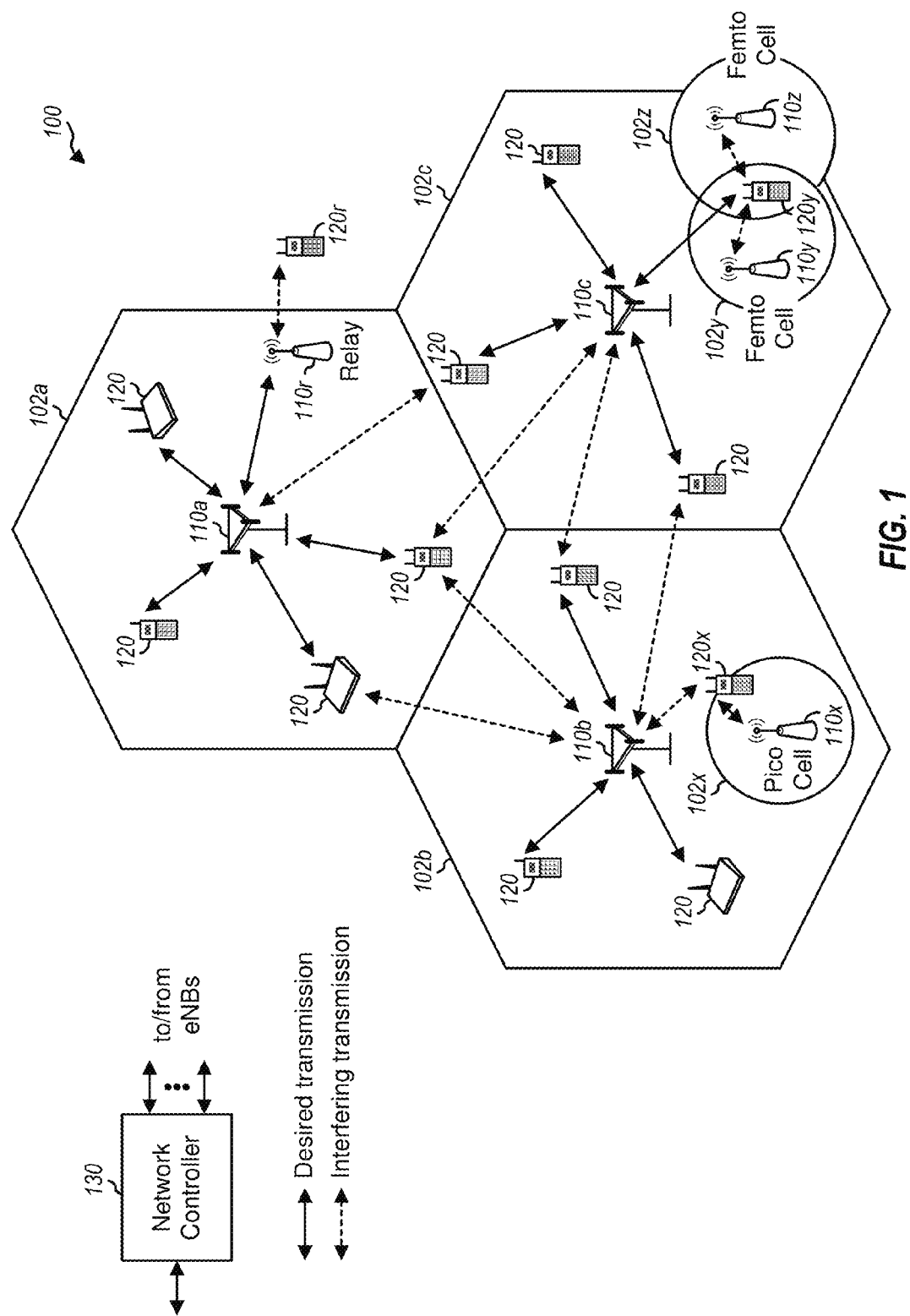
FIG. 1 illustrates a multiple access wireless communication system according to one embodiment.

FIG. 1 shows a wireless communication network 100, which may be an LTE network. The wireless network 100 may include a number of evolved Node Bs (eNBs) 110 and other network entities. An eNB may be a station that communicates with the user equipments (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110*a*, 110*b* and 110*c* may be macro eNBs for the macro cells 102*a*, 102*b* and 102*c*, respectively. The eNB 110*x* may be a pico eNB for a pico cell 102*x*. The eNBs 110*y* and 110*z* may be femto eNBs for the femto cells 102*y* and 102*z*, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

The wireless network 100 may operate on a spectrum or frequency band. For example, the operator of the wireless network 100 may be the primary licensee of the spectrum, i.e. the primary operator or user, such as a governmental entity, a municipal entity, or a commercial entity. Alternatively, the operator of the wireless network 100 may be a secondary operator, or user, of the spectrum. For example, a primary operator that underutilizes their licensed spectrum may allow a number of secondary operators, such as cellular networks, to access part or all of the underutilized spectrum, which may be referred to as authorized shared access (ASA). The secondary operators may be required to vacate portions of the spectrum in use by the primary operator. In one example, the secondary operators may each be allocated a channel of the frequency band, which requires little or no coordination between the secondary operators. Alternatively, all of the secondary operators may share the entire spectrum of the frequency band. One reason for sharing the spectrum may include trunking efficiency, i.e. using other operators white space (either in geographical location or time). It may be assumed that coverage is already solved on another frequency. For example, pico cells may not have full density, thus there may be unused "space" that could be offset by a correlated usage pattern in location and/or time.

Another reason for sharing the spectrum may be availability of frequencies of the spectrum. For example, in time periods when the primary operator is active on the frequency band, the secondary operators must vacate the portion, or channel, of the frequency band used by the primary operator. Thus, some secondary operators may experience service outages on particular channels when the primary operator is active on those particular channels, while secondary operators on other channels may experience no service outage during the same time period. Thus, when an outage occurs on a particular channel, the devices operating on the channel may be migrated to another channel or frequency, preferably one not in use by the primary operator, such as a channel allocated to another secondary operator, thereby effectively amortizing the outage across all of the operators. In this manner, service continuity can be provided for the devices of all of the secondary operators across all time periods. In another example, the secondary operators may operate on their allocated channels during non-outage periods, i.e. none of the spectrum is being utilized by the primary operator, but may share the entire spectrum during outage periods. For example, during outage periods the impacted operator may migrate users to other operators' channels. The techniques for frequency network migration are discussed in FIGS. 3-15 below.

In the example where the secondary operators share the entire spectrum during outage and non-outage periods, there may be no channel allocation, i.e. any operator may use any available ASA frequency. In this example, the secondary operators may utilize dynamic frequency selection when more than one ASA channel is available. In another example, the operators may implement a coordinated macro deployment and additional uncoordinated pico/femto deployment. In this example, the pico/femto base stations may use any available ASA channel. Heterogeneous network (HetNet) methods may be used to provide a common procedure and interface for messaging to protect macros.

A network controller 130 may be coupled to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul. For example, when the eNBs 110 of a secondary operator must vacate a channel or frequency when an outage occurs on the channel, such as due to the primary operator operating on the channel, the eNBs 110 may receive an indication of the outage and channel migration via the backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tabelt, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHzConsequently, the nominal PET size may be equal to 128, 256, 512, 1024 or 2048 for system bandwidth of 1.4, 3, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.4, 3, 5, 10 or 20 MHz, respectively.

Figure 2:
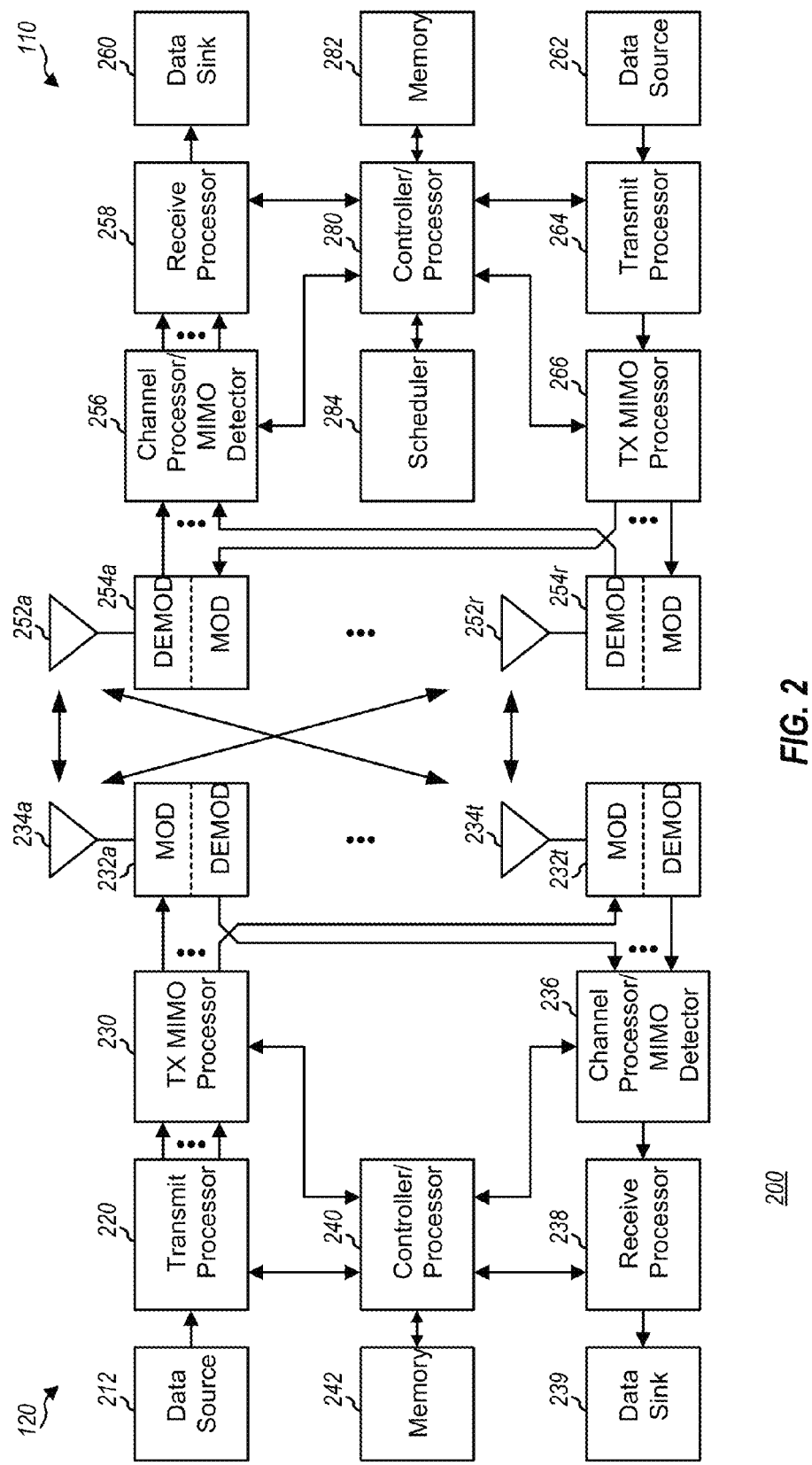
FIG. 2 illustrates a block diagram of a communication system.

FIG. 2 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r, where in general T≥1 and R≥1.

At UE 120, a transmit processor 220 may receive data from a data source 212 and control information from a controller/processor 240. Transmit processor 220 may process (e.g., encode, interleave, and symbol map) the data and control information and may provide data symbols and control symbols, respectively. Transmit processor 220 may also generate one or more demodulation reference signals for multiple non-contiguous clusters based on one or more RS sequences assigned to UE 120 and may provide reference symbols. A transmit (TX) multiple-input multiple-output (MIMO) processor 230 may perform spatial processing (e.g., precoding) on the data symbols, the control symbols, and/or the reference symbols from transmit processor 220, if applicable, and may provide T output symbol streams to T modulators (MODs) 232a through 232t. Each modulator 232 may process a respective output symbol stream (e.g., for SC-FDMA, OFDM, etc.) to obtain an output sample stream. Each modulator 232 may further process (e.g., convert to analog, amplify, filter, and upconvert) the output sample stream to obtain an uplink signal. T uplink signals from modulators 232a through 232t may be transmitted via T antennas 234a through 234t, respectively.

At base station 110, antennas 252a through 252r may receive the uplink signals from UE 120 and provide received signals to demodulators (DEMODs) 254a through 254r, respectively. Each demodulator 254 may condition (e.g., filter, amplify, downconvert, and digitize) a respective received signal to obtain received samples. Each demodulator 254 may further process the received samples to obtain received symbols. A channel processor/MIMO detector 256 may obtain received symbols from all R demodulators 254a through 254r. Channel processor 256 may derive a channel estimate for a wireless channel from UE 120 to base station 110 based on the demodulation reference signals received from UE 120. MIMO detector 256 may perform MIMO detection/demodulation on the received symbols based on the channel estimate and may provide detected symbols. A receive processor 258 may process (e.g., symbol demap, deinterleave, and decode) the detected symbols, provide decoded data to a data sink 260, and provide decoded control information to a controller/processor 280.

On the downlink, at base station 110, data from a data source 262 and control information from controller/processor 280 may be processed by a transmit processor 264, precoded by a TX MIMO processor 266 if applicable, conditioned by modulators 254a through 254r, and transmitted to UE 120. At UE 120, the downlink signals from base station 110 may be received by antennas 234, conditioned by demodulators 232, processed by a channel estimator/MIMO detector 236, and further processed by a receive processor 238 to obtain the data and control information sent to UE 120. Processor 238 may provide the decoded data to a data sink 239 and the decoded control information to controller/processor 240.

Controllers/processors 240 and 280 may direct the operation at UE 120 and base station 110, respectively. Processor 220, processor 240, and/or other processors and modules at UE 120 may perform or direct process 800 in FIG. 8, and/or other processes for the techniques described herein. Memories 242 and 282 may store data and program codes for UE 120 and base station 110, respectively. A scheduler 284 may schedule UEs for downlink and/or uplink transmission and may provide allocations of resources (e.g., assignment of multiple non-contiguous clusters, RS sequences for demodulation reference signals, etc.) for the scheduled UEs.

Figure 3:
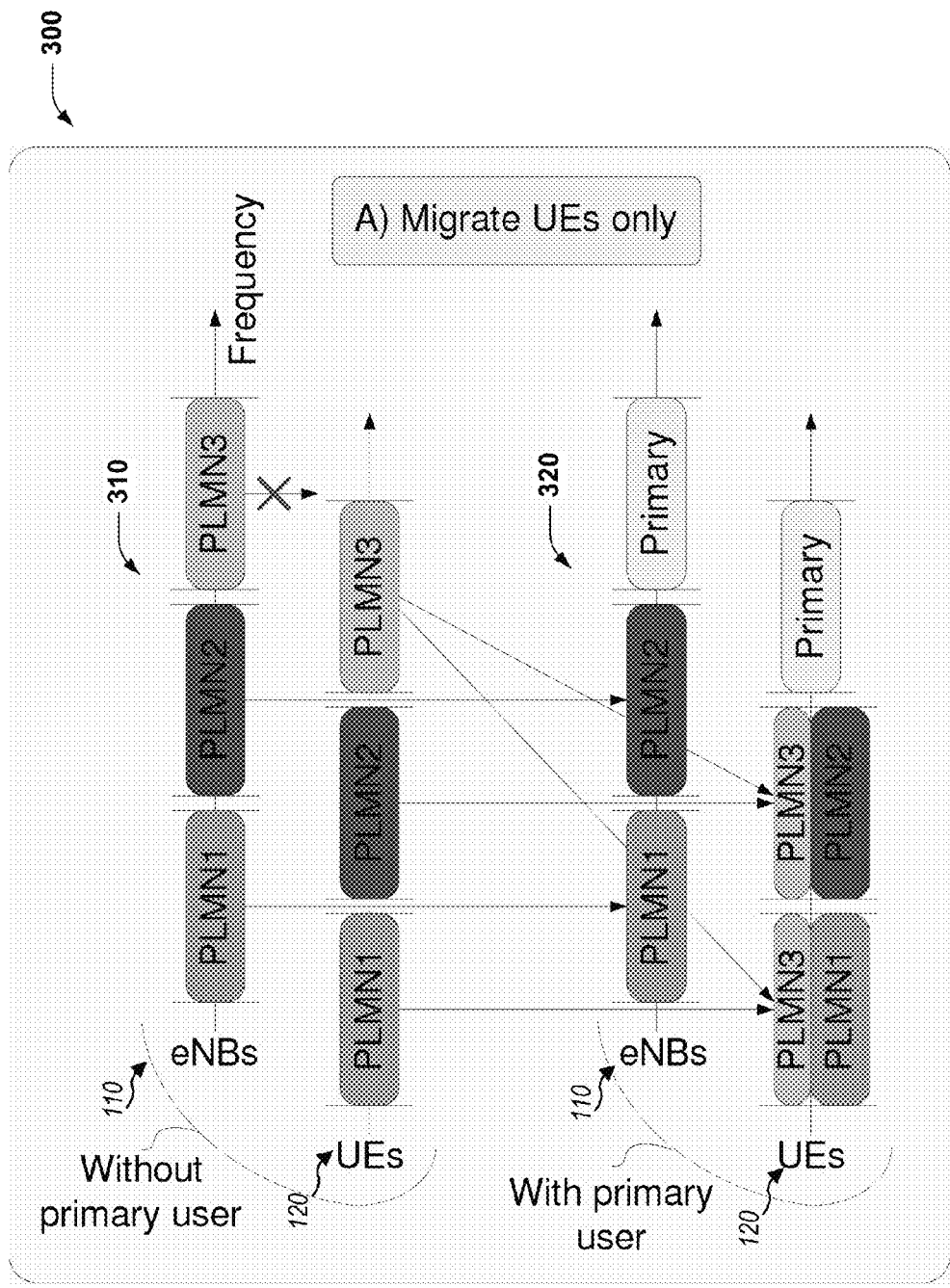
FIG. 3 illustrates a diagram of an exemplary frequency migration on the downlink of user equipment in a communication system.

FIG. 3 illustrates a diagram 300 of an exemplary frequency migration on the downlink in a communication system where only the UEs 120 are migrated upon a service outage, such as a service outage caused by the primary operator accessing a portion of an ASA spectrum. FIG. 3 illustrates the frequency allocation of an ASA spectrum amongst the eNBs 110 and UEs 120 of secondary operators, i.e. public land mobile network (PLMN) operators, when the primary operator is not active on the spectrum 310, and the frequency allocation of the ASA spectrum when the primary operator is active on the spectrum 320. As shown in FIG. 3, while the primary operator is active on the portion of the spectrum utilized by the PLMN3, the eNBs 110 of PLMN3 are unused while the UEs 120 of PLMN3 are migrated to portions of the frequency spectrum unaffected by the outage, e.g. the channels allocated to PLMN1 and PLMN2. Thus, FIG. 3 illustrates spectrum sharing with temporary change in access control (Block D model). The UEs 120 of PLMN3 may be distributed evenly across all available channels, e.g. the channels allocated to PLMN1 and PLMN2 in FIG. 3. However, as illustrated in FIG. 3, the eNBs of PLMN3 are not utilized, thereby wasting the infrastructure hardware resource taken up by the outage.

Figure 4:
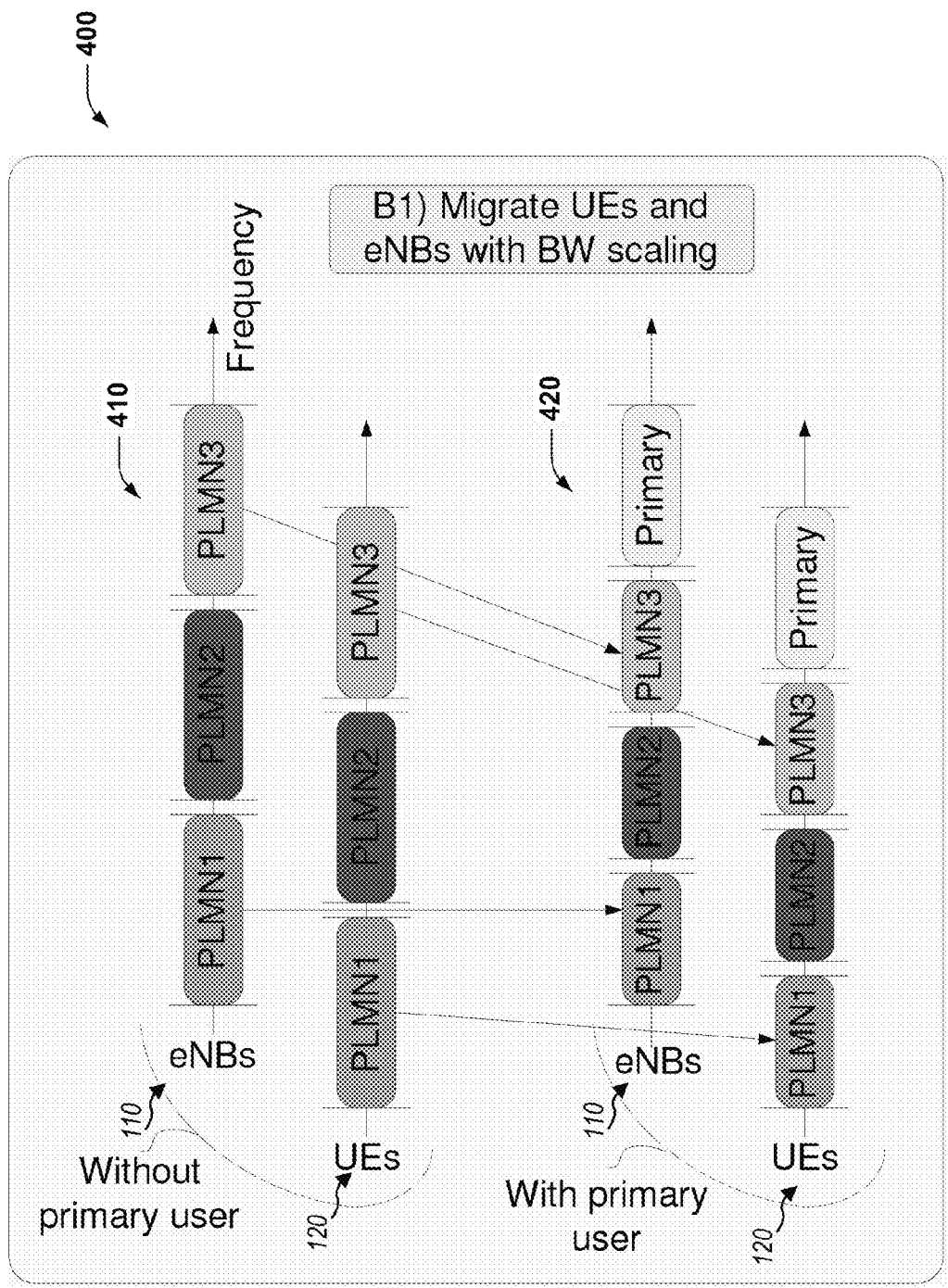
FIG. 4 illustrates a diagram of an exemplary frequency migration on the downlink of user equipment and base stations with bandwidth scaling in a communication system.

FIG. 4 illustrates a diagram 400 of an exemplary frequency migration on the downlink in a communication system where the UEs 120 and eNBs 110 are migrated using bandwidth scaling upon a service outage, such as a service outage caused by the primary operator accessing a portion of an ASA spectrum. FIG. 4 illustrates the frequency allocation of an ASA spectrum amongst the eNBs 110 and UEs 120 of secondary operators, i.e. public land mobile network (PLMN) operators, when the primary operator is not active on the spectrum 410, and the frequency allocation of the ASA spectrum when the primary operator is active on the spectrum 420. As shown in FIG. 4, while the primary operator is active on the portion of the spectrum utilized by PLMN3, the eNBs 110 and the UEs 120 of PLMN3 are allocated a portion of the frequency spectrum unaffected by the outage, e.g. a portion of the channels allocated to PLMN1 and PLMN2. This method of frequency migration may increase network capacity, such as when the eNBs 110 are not fully co-located. The eNBs 110 may support some frequency agility (only slow changes required).

In one example, PLMN3 may be allocated a channel by compressing all of the secondary operators' channels unaffected by the outage to linearly match the available bandwidth. For example, if four secondary operators are each allocated 20 MHz of the spectrum, and the primary operator is active on 20 MHz of the spectrum, then the four secondary operators are re-allocated 15 MHz of the spectrum, i.e. the 60 MHz of the spectrum not in use by the primary operator divided by four. The UEs 120 and eNBs 110 of each secondary operator may be migrated to the compressed portion of the spectrum allocated to each secondary operator, if necessary. This exemplary method of frequency migration may work for both collocated and non-collocated cases. However, the set of supported channel bandwidth options may need to be considered in this exemplary method.

Figure 5:
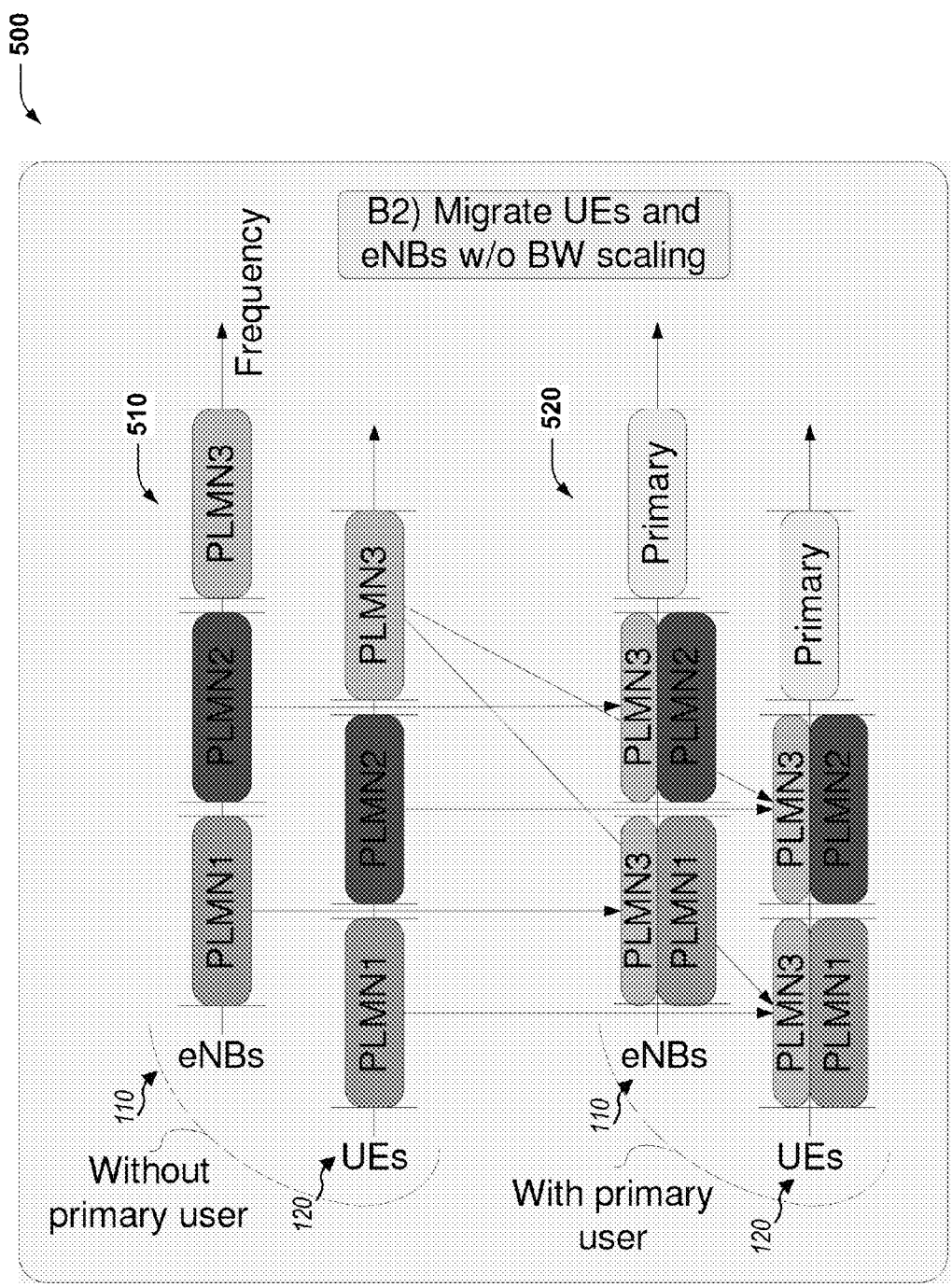
FIG. 5 illustrates a diagram of an exemplary frequency migration on the downlink of user equipment and base stations in a communication system.

FIG. 5 illustrates a diagram 500 of an exemplary frequency migration on the downlink in a communication system where the UEs 120 and eNBs 110 are migrated without using bandwidth scaling upon a service outage, such as a service outage caused by the primary operator accessing a portion of an ASA spectrum. FIG. 5 illustrates the frequency allocation of an ASA spectrum amongst the eNBs 110 and UEs 120 of secondary operators, i.e. public land mobile network (PLMN) operators, when the primary operator is not active on the spectrum 510, and the frequency allocation of the ASA spectrum when the primary operator is active on the spectrum 520. As shown in FIG. 5, while the primary operator is active on the portion of the spectrum utilized by PLMN3, the eNBs 110 and the UEs 120 of PLMN3 are migrated to the portions of the frequency spectrum unaffected by the outage without changing the bandwidth allocation, e.g. migrating to the channels allocated to PLMN1 and PLMN2. The UEs 120 and eNBs 110 of PLMN3 may be distributed evenly across all available channels, e.g. the channels allocated to PLMN1 and PLMN2 in FIG. 5. The eNBs 110 may support some frequency agility (only slow changes required).

In this example of frequency migration, the number of eNBs 110 on the same frequency may be increased. Different access methods may be utilized during the outage. For example, the system may utilize radio access network (RAN) sharing, which may allow mutual open access and handover. The RAN sharing may operate more effectively in non-fully collocated cases. Alternatively, the access method may be closed spectrum sharing, e.g. HetNet-type time partitioning among macros. The closed spectrum sharing may be effective in both collocated and non-collocated cases; although the closed spectrum sharing may only provide gain in the non-collocated case.

FIG. 6 is a flow chart representation of a wireless communication methodology 600. At box 602, an outage on a first channel of a plurality of channels of a spectrum is identified, where each channel of the plurality of channels is allocated to one of a plurality of operators. In one or more embodiments, the outage on the first channel may be identified by receiving a request from the primary operator to access the first channel, by detecting the presence of the primary operator on the first channel, or by detecting that the channel is no longer available.

At box 604, mobile stations 120 in communication over the first channel of the plurality of channels are migrated to at least one other channel of the plurality of channels during the outage. In one example, the at least one other channel may be allocated to a different secondary operator than the first channel of the plurality of channels. In another example, the mobile stations 120 may be distributed evenly across the plurality of channels of the spectrum unaffected by the outage, e.g. the channels of the other secondary operators. For example, the mobile stations 120 may receive an indication, such as a control signal, to migrate to the at least one other channel, i.e. to operate on the frequency of the at least one other channel. The base stations 110 in communication over the first channel may also be migrated to the at least one other channel, as discussed in FIGS. 4 and 5. The base stations 110 may also be evenly distributed across the plurality of channels of the spectrum unaffected by the outage. For example, the base stations 110 may receive an indication via the backhaul to migrate to the at least one other channel, i.e. to operate on the frequency of the at least one other channel. The mobile stations 120 and base stations 110 may be migrated back to the first channel when the outage on the first channel ends.

Alternatively or in addition, the at least one other channel may be generated by linearly scaling the bandwidth of the plurality of channels of the spectrum unaffected by the outage. The mobile stations 120 and base stations 110 in communication over the first channel may then be migrated to the generated at least one channel, and the mobile stations 120 and base stations 110 previously operating on the unaffected channels may be migrated to the frequency band of the scaled channels, if necessary.

FIG. 7 is a block diagram representation of a portion of a wireless communication apparatus 700. The module 702 is provided for identifying an outage on a first channel of a plurality of channels of a spectrum, where each of the plurality of channels is allocated to one of a plurality of operators. In one or more embodiments, the outage on the first channel may be identified by receiving a request from the primary operator to access the first channel, by detecting the presence of the primary operator on the first channel, or by detecting that the channel is no longer available.

Module 704 is provided for migrating mobile stations in communication over the first channel of the plurality of channels to at least one other channel of the plurality of channels during the outage. In an aspect, the base stations 120 in communication over the first channel may also be migrated to the at least one other channel. The mobile stations 110 and base stations 110 may be migrated back to the first channel when the outage on the first channel ends.

Figures 8, 9:
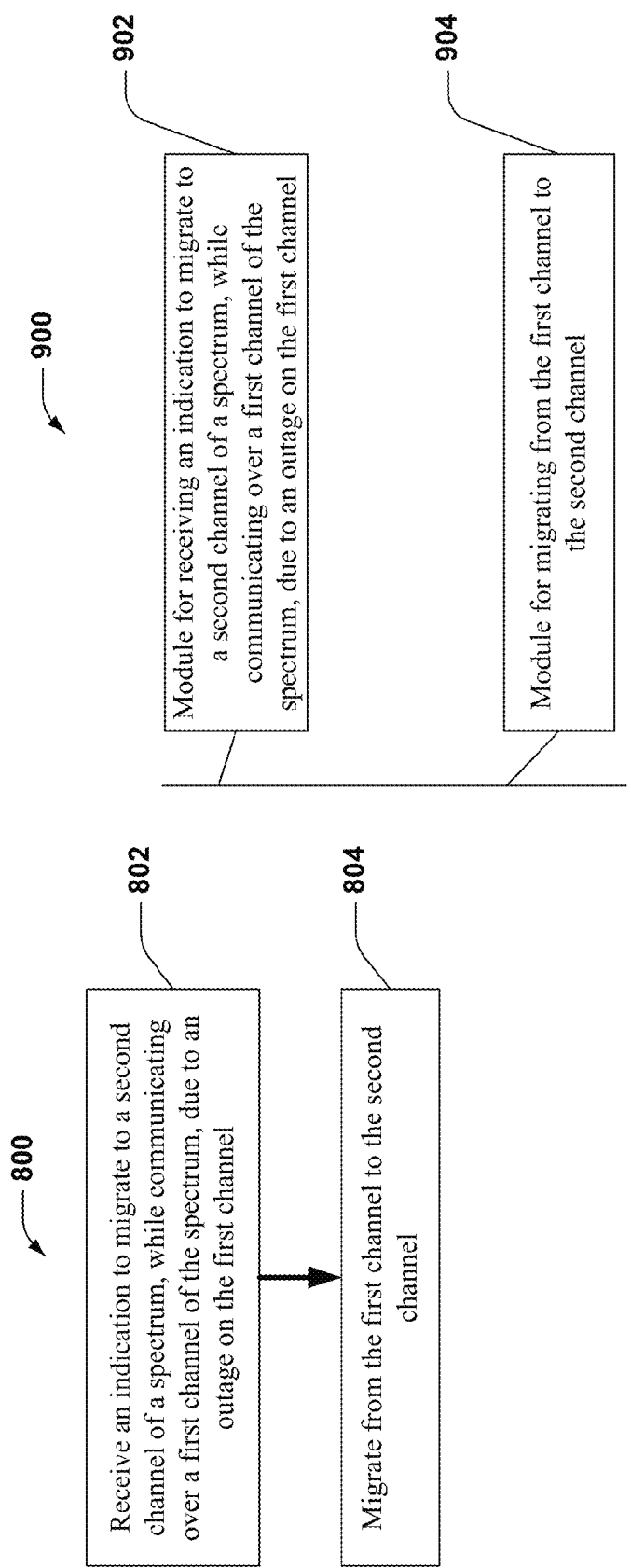
FIG. 8 is a flow chart representation of a process for wireless communication.
FIG. 9 is a block diagram representation of a portion of a wireless communication apparatus.

FIG. 8 is a flow chart representation of a wireless communication methodology 800. At box 802, an indication is received to migrate to a second channel of a spectrum, while communicating over a first channel of the spectrum, due to an outage on the first channel. The indication may be received by a base station 110 or a mobile station 120. For example, a base station 110 may receive an indication via the backhaul to migrate to the at least one other channel, i.e. to operate on the frequency of the at least one other channel. Alternatively, a mobile station 120 may receive an indication, such as a control signal, to migrate to the at least one other channel, i.e. to operate on the frequency of the at least one other channel. Alternatively or in addition, the mobile station 120 and/or the base station 110 may dynamically detect the outage on the first channel, without receiving an indication. In one or more embodiments, the outage on the first channel may be identified by receiving a request from the primary operator to access the first channel, by detecting the presence of the primary operator on the first channel, or by detecting that the channel is no longer available.

At box 804, a migration from the first channel to the second channel occurs. For example, the mobile station 120 or base station 110 may migrate to the second channel, such as by operating on a frequency of the second channel. The mobile station 120 or base station 110 may migrate back to the first channel when the outage on the first channel ends. In one example, the first channel may be allocated to a different operator than the second channel. In another example, the second channel may be generated by reallocating bandwidth from channels of the spectrum unaffected by the outage.

FIG. 9 is a block diagram representation of a portion of a wireless communication apparatus 900. The module 902 is provided for receiving an indication to migrate to a second channel of a spectrum, while communicating over a first channel of the spectrum, due to an outage on the first channel. Module 904 is provided for migrating from the first channel to the second channel.

Figure 10:
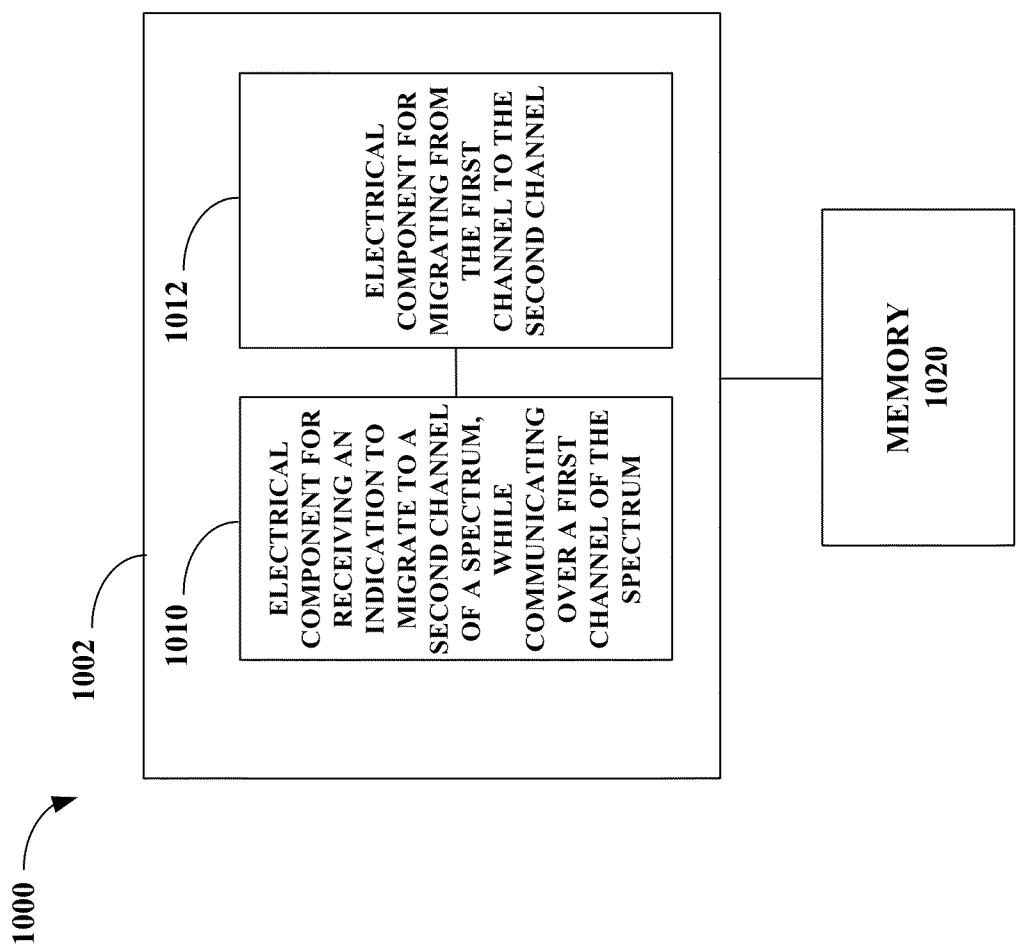
FIG. 10 illustrates an exemplary coupling of electrical components that facilitates frequency migration.

FIG. 10 is a block diagram of a system 1000 that facilitates frequency migration. System 1000 includes functional blocks that can represent functions implemented by a processor, software, or combination thereof (e.g., firmware), wherein system 1000 includes a logical grouping 1002 of electrical components that can act in conjunction. As illustrated, logical grouping 1002 can include an electrical component for receiving an indication to migrate to a second channel of a spectrum, while communicating over a first channel of the spectrum, due to an outage on the first channel 1010, as well as an electrical component for migrating from the first channel to the second channel 1012. Additionally, system 1000 can include a memory 1020 that retains instructions for executing functions associated with electrical components 1010 and 1012, wherein any of electrical components 1010 and 1012 can exist either within or outside memory 1020.

In accordance with one or more aspects of the embodiments described herein, there are provided methods for frequency spectrum sharing. With reference to FIG. 11, illustrated is a methodology 1100 that may be performed at a central network entity, such as, for example, an Operation, Administration and Maintenance (OAM) server or the like. The method 1100 may involve, at 1110, identifying an outage on a first channel of a plurality of channels of a spectrum, wherein each of the plurality of channels is allocated to one of a plurality of operators. The method 1100 may involve, at 1120, migrating all mobile stations (e.g., UEs) in communication over the first channel of the plurality of channels to at least one other channel of the plurality of channels during the outage.

With reference to FIGS. 12-13, there are shown further operations or aspects of method 1100 that are optional and may be performed by a central network entity for frequency spectrum sharing. It is noted that the blocks shown in FIGS. 12-13 are not required to perform the method 1100, and that each block may stand on its own. If the method 1100 includes at least one block of FIGS. 12-13, then the method 1100 may terminate after the at least one block, without necessarily having to include any subsequent downstream block(s) that may be illustrated. For example, with reference to FIG. 12, migrating all of the mobile stations (block 1120) may involve evenly distributing each of the mobile stations across the plurality of channels unaffected by the outage (block 1130).

In one example, the at least one other channel of the plurality of channels may be allocated to a different operator than the first channel of the plurality of channels (block 1140). The method 1100 may further involve migrating at least a subset of base stations in communication over the first channel of the plurality of channels to the at least one other channel of the plurality of channels (block 1142). The method 1100 may further involve evenly distributing the at least the subset of the base stations across the plurality of channels unaffected by the outage (block 1144).

With reference to FIG. 13, the method 1100 may further involve generating the at least one other channel by scaling a bandwidth of the plurality of channels unaffected by the outage (block 1150). The method 1100 may further involve migrating each of the mobile stations back to the first channel, in response to an end of the outage on the first channel (block 1160). Identifying the outage (block 1110) may involve receiving a request for the first channel from a primary operator of the spectrum (block 1170). Migrating all of the mobile stations (block 1120) may involve transmitting, to each of the mobile stations, an indication to migrate to the at least one other channel (block 1180). The central network entity may be an OAM server or the like (block 1190).

Figure 14:
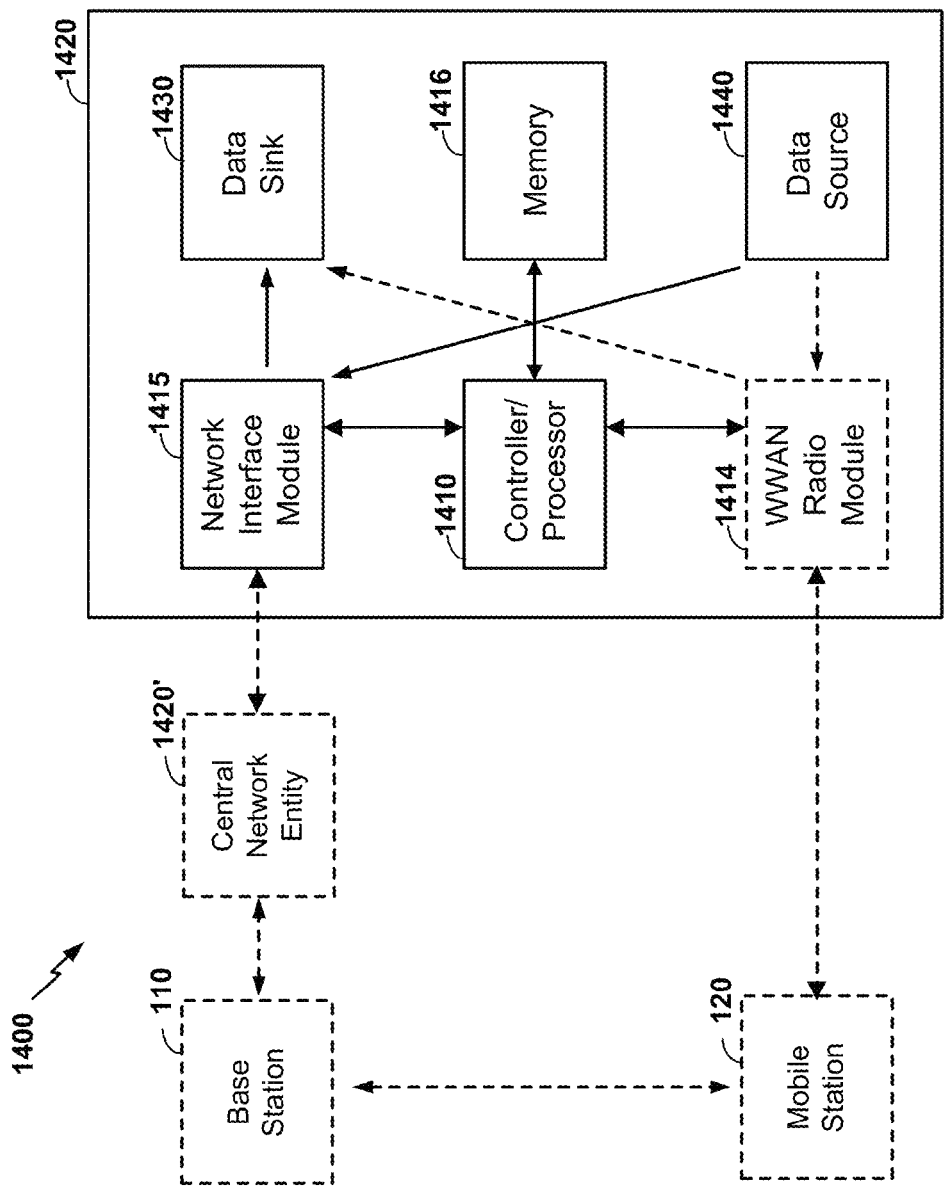
FIG. 14 illustrates an embodiment of an apparatus for frequency spectrum sharing, in accordance with the methodologies of FIGS. 11-13.

In accordance with one or more aspects of the embodiments described herein, there are provided devices and apparatuses for frequency spectrum sharing, as described above with reference to FIGS. 11-13. With reference to FIG. 14, there is provided an exemplary apparatus that is a central network entity 1420 in a wireless communication network 1400. The central network entity 1420 may be in operative communication with another central network entity 1420' that is in operative communication with a base station 110 (e.g., an eNB or the like). The base station 110 may be in operative communication with a mobile station 120 (e.g. a UE or the like). In the alternative, or in addition, the central network entity 1420 may be in direct communication (not shown) with the base station. In the alternative, or in addition, the central network entity 1420 may be in direct communication with the mobile station 120.

In related aspects, the central network entity 1420 may include a network interface module 1415 for communicating with the base station 110 and/or another central network entity 1420'. The network interface 1415 may be coupled to a controller/processor module 1410 that directs that operation of the central network entity 1420 and/or component(s) thereof. The controller/processor module 1410 may be coupled to a memory 1416 that stores data and program codes for the central network entity 1420. The network interface module 1415 may include a receiver component (not shown) for providing data to a data sink 1430 and for providing control information to the controller/processor module 1410. The central network entity 1420 may also include a data source 1440 coupled to a transmitter component (not shown) of the network interface 1415.

In further related aspects, the central network entity 1420 may optionally include a cellular or wireless wide area network (WWAN) radio module 1414 for communicating with the mobile station 120. The WWAN radio module 1414 may include one or more components for the base station 110 shown on the right hand side of FIG. 2. The WWAN radio module 1414 may be coupled to the controller/processor module 1410, the data sink 1430, and/or the data source 1440.

In yet further related aspects, the controller/processor module 1410 may be configured to: identify an outage on a first channel of a plurality of channels of a spectrum, wherein each of the plurality of channels is allocated to one of a plurality of operators; and migrate all mobile stations in communication over the first channel of the plurality of channels to at least one other channel of the plurality of channels during the outage. In the alternative, or in addition, the controller/processor module 1410 may direct the other components of the central network entity 1420 to perform such operations. In still further related aspects, the memory 1416 may contain code, data, or instructions to facilitate the operation of one or more of the blocks shown in FIGS. 11-13 by the one or more of the components of central network entity 1420.

With reference to FIG. 15, there is provided an exemplary apparatus 1500 that may be configured as a central network entity (e.g., an OAM server or the like) in a wireless network, or as a processor or similar device for use within the central network entity. The apparatus 1500 may include functional blocks that can represent functions implemented by a processor, software, or combination thereof (e.g., firmware).

As illustrated, in one embodiment, the apparatus 1500 may comprise an electrical component or module 1502 for identifying an outage on a first channel of a plurality of channels of a spectrum, wherein each of the plurality of channels is allocated to one of a plurality of operators. For example, the electrical component 1502 may include at least one control processor coupled to a network interface or the like and to a memory with instructions for frequency spectrum sharing. The electrical component 1502 may be, or may include, a means for identifying an outage on a first channel of a plurality of channels of a spectrum, wherein each of the plurality of channels is allocated to one of a plurality of operators. Said means may be or may include the at least one control processor (e.g., the controller/processor 1410 of FIG. 14) operating an algorithm. The algorithm may include, for example, analyzing and comparing data received from the mobile stations and/or other network entities, in accordance with FIGS. 11-13 or variations thereof.

The apparatus 1500 may comprise an electrical component 1504 for migrating all mobile stations in communication over the first channel of the plurality of channels to at least one other channel of the plurality of channels during the outage. For example, the electrical component 1504 may include at least one control processor coupled to a network interface or the like and to a WWAN radio module or the like. The electrical component 1504 may be, or may include, a means for migrating all mobile stations in communication over the first channel of the plurality of channels to at least one other channel of the plurality of channels during the outage. Said means may be or may include the controller/processor 1410, the network interface 1415, and the WWAN radio module 1414 of FIG. 14, and components thereof. For example, the controller/processor 1410, the network interface 1415, and the WWAN radio module 1414 may instruct that mobile stations and/or network entities in communication with the mobile stations to coordinate the migration of all of the mobile stations in communication over the first channel of the plurality of channels of the spectrum.

In related aspects, the apparatus 1500 may optionally include a processor component 1510 having at least one processor, in the case of the apparatus 1500 configured as a network entity, rather than as a processor. The processor 1510, in such case, may be in operative communication with the components 1502-1504 via a bus 1512 or similar communication coupling. The processor 1510 may effect initiation and scheduling of the processes or functions performed by electrical components 1502-1504.

In further related aspects, the apparatus 1500 may include a network interface 1515 for interfacing and communicating with other central network entities, or with eNBs or the like. The apparatus 1500 may include a radio transceiver component 1514. A stand alone receiver and/or stand alone transmitter may be used in lieu of or in conjunction with the transceiver 1514. The apparatus 1500 may optionally include a component for storing information, such as, for example, a memory device/component 1516. The computer readable medium or the memory component 1516 may be operatively coupled to the other components of the apparatus 1500 via the bus 1512 or the like. The memory component 1516 may be adapted to store computer readable instructions and data for effecting the processes and behavior of the components 1502-1504, and subcomponents thereof, or the processor 1510, or the methods disclosed herein (e.g., method 1100 shown in FIGS. 11-13) and variations thereof. The memory component 1516 may retain instructions for executing functions associated with the components 1502-1504. While shown as being external to the memory 1516, it is to be understood that the components 1502-1504 can exist within the memory 1516.

In accordance with one or more aspects of the embodiments described herein, there are provided methods for frequency spectrum sharing, operable by a mobile station or the like. For example, the method may involve while communicating over a first channel of a spectrum, receiving an indication to migrate to a second channel of the spectrum along with each other mobile station communicating on the first channel, due to an outage on the first channel. The method may involve migrating from the first channel to the second channel, in response to the indication. In related aspects, the method may further involve migrating back to the first channel, in response to the outage ending on the first channel.

In further related aspects, the second channel of the spectrum may be allocated to a different operator than the first channel of the spectrum. The second channel may include bandwidth reallocated from channels of the spectrum unaffected by the outage. The outage on the first channel may be due to reallocation of the first channel to a primary operator of the spectrum.

It will be appreciated that several architectures and techniques for network frequency migration of wireless communication systems that share a frequency spectrum are disclosed. It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein (e.g., identifiers, assigners, transmitters and allocators), may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method operable by a central network entity in a wireless communication network, the method comprising:
   identifying, based on a primary operator requesting access to a first channel of spectrum allocated to a secondary operator for accessing the first channel, an outage on the first channel, wherein the first channel is one of a plurality of channels of the spectrum, the primary operator has a primary license for the first channel, the secondary operator has a secondary license for the first channel, and the primary license has higher priority than the secondary license;
   transmitting, based on identifying the outage, an indication to migrate at least one of a mobile station or a base station associated with the secondary operator, and in communication over the first channel, to at least one other channel of the plurality of channels of the spectrum, the at least one other channel being associated with a bandwidth that is based on a quantity of secondary operators and a quantity of available bandwidth not associated with the outage; and
   migrating, based on monitoring a duration of the outage, the at least one of the mobile station or the base station back to the first channel when the outage ends.

2. The method of claim 1, wherein
   the mobile station is one of a plurality of mobile stations and the base station is one of a plurality of base stations, and
   the method further includes:
      evenly distributing at least one of the plurality of mobile stations or the plurality of base stations across a plurality of channels unaffected by the outage.

3. The method of claim 1, wherein the at least one other channel of the plurality of channels is allocated to a different operator than the secondary operator.

4. The method of claim 1, wherein
   the mobile station is one of a plurality of mobile stations and the base station is one of a plurality of base stations, and
   the method further includes:
      migrating at least a subset of at least one of the plurality of mobile stations or the plurality of base stations to the at least one other channel.

5. The method of claim 4, further comprising:
   evenly distributing the at least the subset of the at least one of the plurality of mobile stations or the plurality of base stations across a plurality of channels unaffected by the outage.

6. The method of claim 1, further comprising:
   generating the at least one other channel by scaling a bandwidth of a plurality of channels unaffected by the outage.

7. The method of claim 1, wherein the central network entity comprises an Operation, Administration and Maintenance (OAM) server.

8. An apparatus for wireless communication, comprising:
   a memory configured to store instructions; and
   at least one processor configured to execute the instructions to:
      identify, based on a primary operator requesting access to a first channel of spectrum allocated to a secondary operator for accessing the first channel, an outage on the first channel o, wherein the first channel is one of a plurality of channels of the spectrum, the primary operator has a primary license for the first channel, the secondary operator has a secondary license for the first channel, and the primary license has higher priority than the secondary license;

transmit, based on identifying the outage, an indication to migrate at least one of a mobile station or a base station associated with the secondary operator, and in communication over the first channel, to at least one other channel of the plurality of channels of the spectrum, the at least one other channel being associated with a bandwidth that is based on a quantity of secondary operators and a quantity of available bandwidth not associated with the outage; and migrate, based on monitoring a duration of the outage, the at least one of the mobile station or the base station back to the first channel when the outage ends.

9. The apparatus of claim 8, wherein the mobile station is one of a plurality of mobile stations and the base station is one of a plurality of base stations, and the at least one processor is further configured to:

evenly distribute the at least one of the plurality of mobile stations or the plurality of base stations across a plurality of channels unaffected by the outage.

10. The apparatus of claim 8, wherein the at least one other channel of the plurality of channels is allocated to a different operator than the secondary operator.

11. The apparatus of claim 8, wherein the mobile station is one of a plurality of mobile stations and the base station is one of a plurality of base stations, and the at least one processor is further configured to:

migrate at least a subset of the at least one of the plurality of mobile stations or the plurality of base stations to the at least one other channel.

12. The apparatus of claim 11, wherein the at least one processor is further configured to:

evenly distribute the at least the subset of the at least one of the plurality of mobile stations or the plurality of base stations across a plurality of channels unaffected by the outage.

13. An apparatus for wireless communication, comprising:

means for identifying, based on a primary operator requesting access to a first channel of spectrum allocated to a secondary operator for accessing the first channel, an outage on the first channel, wherein the first channel is one of a plurality of channels of the spectrum, the primary operator has a primary license for the first channel, the secondary operator has a secondary license for the first channel, and the primary license has higher priority than the secondary license;

means for transmitting, based on identifying the outage, an indication to migrate at least one of a mobile station or a base station associated with the secondary operator, and in communication over the first channel, to at least one other channel of the plurality of channels of the spectrum, the at least one other channel being associated with a bandwidth that is based on a quantity of secondary operators and a quantity of available bandwidth not associated with the outage; and means for migrating, based on monitoring a duration of the outage, the at least one of the mobile station or the base station back to the first channel when the outage ends.

14. The apparatus of claim 13, wherein the mobile station is one of a plurality of mobile stations and the base station is one of a plurality of base stations, further comprising:

means for evenly distributing the at least one of the plurality of mobile stations or the plurality of base stations across a plurality of channels unaffected by the outage.

15. The apparatus of claim 13, wherein the at least one other channel of the plurality of channels is allocated to a different operator than the secondary operator.

16. The apparatus of claim 13, wherein the mobile station is one of a plurality of mobile stations and the base station is one of a plurality of base stations, further comprising:

means for migrating at least a subset of the at least one of the plurality of mobile stations or the plurality of base stations to the at least one other channel.

17. The apparatus of claim 16, further comprising:

means for evenly distributing the at least the subset of the at least one of the plurality of mobile stations or the plurality of base stations across a plurality of channels unaffected by the outage.

18. A non-transitory computer-readable storage medium storing instructions, the instructions comprising:

one or more instructions which, when executed by a processor, cause the processor to:

identify, based on a primary operator requesting access to a first channel of spectrum allocated to a secondary operator for accessing the first channel, an outage on the first channel, wherein the first channel is one of a plurality of channels of the spectrum, the primary operator has a primary license for the first channel, the secondary operator has a secondary license for the first channel, and the primary license has higher priority than the secondary license;

transmit, based on identifying the outage, an indication to migrate at least one of a mobile station or a base station associated with the secondary operator, and in communication over the first channel, to at least one other channel of the plurality of channels of the spectrum, the at least one other channel being associated with a bandwidth that is based on a quantity of secondary operators and a quantity of available bandwidth not associated with the outage; and migrate, based on monitoring a duration of the outage, the at least one of the mobile station or the base station back to the first channel when the outage ends.

19. The non-transitory computer-readable storage medium of claim 18, wherein the mobile station is one of a plurality of mobile stations and the base station is one of a plurality of base stations, and the instructions further comprise:

one or more instructions to evenly distribute the at least one of the plurality of mobile stations or the plurality of base stations across a plurality of channels unaffected by the outage.

20. The non-transitory computer-readable storage medium of claim 18, wherein the at least one other channel of the plurality of channels is allocated to a different operator than the secondary operator.

21. The non-transitory computer-readable storage medium of claim 18, wherein
the mobile station is one of a plurality of mobile stations and the base station is one of a plurality of base stations, and
the instructions further include:
one or more instructions to migrate at least a subset of the at least one of the plurality of mobile stations or the plurality of base stations to the at least one other channel.

* * * * *